July 28, 1931.    S. F. ACREE    1,816,138
TAN EXTRACT AND MODE OF MAKING SAME
Filed Nov. 8, 1922
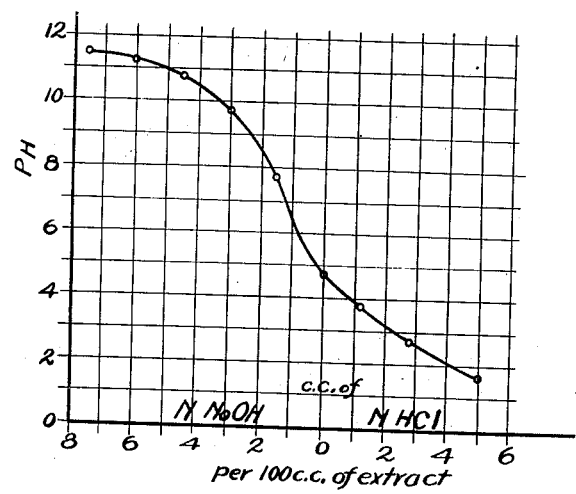
Inventor
Solomon F. Acree
By William M. Fairfax
Attorney Patented July 28, 1931

1,816,138

UNITED STATES PATENT OFFICE

SOLOMON F. ACREE, OF EUREKA, MONTANA

TAN EXTRACT AND MODE OF MAKING SAME

Application filed November 8, 1922. Serial No. 599,708.

This invention comprises the extraction and utilization of organic compounds such as tannins or tannin like materials, and tan liquors containing galactan, galactose and other sugars, from properly disintegrated and treated cellulosic raw materials, such as the bark and wood of western larch (Larix occidentalis), by methods which leave such extracted cellulosic raw materials in better condition for the simultaneous or subsequent production therefrom of high grade cellulosic products, such as paper pulp.

The invention is applicable to woods like western larch or similar woody material which contain large quantities of easily dissolved organic compounds, such as galactan and tannin materials.

The invention embodies specifically the extraction of galactan and galactose, glucose, pentoses, and of tanning materials from the properly disintegrated and treated bark and wood of western larch, especially from the waste portions thereof such as butt logs particularly, mill waste like the bark and slabs and edgings from lumber and tie logs (railroad ties), sawdust, shavings, forest waste like stumps, roots, limbs, etc.

The annexed drawing shows a titration curve for a sample of chestnut wood extract.

The larch chips are best extracted in a continuous or counter-current self-dumping battery system previously described in my pending applications (Serial No. 160,909 filed April 10, 1917 and renewed April 2, 1921) in which about three parts of the hot extracting liquid, such as water or dilute acid, are used in each one of the series of cells to extract successive batches of chips, including finally fresh chips. The subject matter of the present case is in large part continued from Ser. No. 160,909, here referred to. The liquid thereby becomes richer in galactan or galactose and in other carbohydrates such as glucose, pentoses, etc., and in tannin, while each batch of chips is increasingly freed from such soluble constituents and is finally washed and replaced by fresh chips. The extracting liquid can be flowed practically continuously through the battery, especially if it contains many cells. Or the liquid can be held and circulated in each cell for a period of time, such as 30 to 60 minutes, and then passed on to the next cell during which step it is advantageous to save time by using the continuous flow system in all the cells and drawing off the most concentrated liquor from the fresh chips to storage or to the evaporating pan, etc., while running wash water on the hot almost fully extracted chips. This step is followed by the removal of such wash water for further use in extraction and removal of the extracted chips prior to or following digestion with suitable pulping liquors and replacement thereof by fresh chips while the remaining wood batches are undergoing the extraction treatment.

This continuous battery system gives a high sugar concentration in the leach liquor, such as ten to fifteen percent depending on the number of cells, but the concentration can be raised by dumping the chips or the pulp from two or more cells consecutively and filling them with fresh chips which are treated consecutively with a preceding extract. The chips are thereby treated less often and the sugar yield is slightly lower, but the sugar concentration in the extract is higher and this cuts down the load on the evaporating pans when such further concentration is required and the evaporating capacity is a serious factor in proper balance of plant operations. In such a system of cells the heating can be done by injection of steam or by closed coils within the cells or preferably by drawing the liquid through a screen in the bottom of the cell to keep it free of chips and circulating it through a preheater to the top of the cell.

The temperature of the extracting liquid can be fixed at any temperature from say 75° C. to 160° C. or higher but about 100° C. is very satisfactory. The chips in each cell and especially the fresh chips can be given a straight liquid cook, as described, or given a preliminary dry or vapor cook, at say 130 to 160° C. or higher with or without added acid, such as nitric or sulphuric acid, equal to one percent of the weight of the wood, and then given an extraction in the same battery system and subsequent pulping treatments as described below. In general, however, the use of strong hydrolytic acids at higher temperatures tends to hydrate and weaken the cellulose and so when making both carbohydrates and pulp I prefer to limit the extraction to the use of water or to about one percent acid solutions at about 100° C. for a total of only two or three hours. The acid agent can be fortified before use in each cell.

For example, iron cells can be used for extraction of the galactan, etc., by water and subsequent treatment of the chips with soda or sulphate liquors. Or tile-lined acid-proof cells with duriron fittings can be used for extraction with dilute acids such as one percent nitric acid, mother liquors from mucic acid, sulphuric or oxalic acid, etc., and for subsequent cooking of the extracted chips with e. g. sulphite liquors. When the same cells are used for both extraction or extraction and hydrolysis and for the pulping operation, the latter requires so much more time than the extraction, about eight hours versus three hours, that the second and successive extract liquors are conveniently run to intermediate storage for further use in making the first and successive extractions of the next batch of fresh chips. This method gives a higher yield of extract and better chips for pulping than the method of making only one extraction and the pulping treatment of the chips in the same digester.

Another method is to use the extraction battery as an independent low pressure unit and remove the hot extracted chips. As the chips tend to pack and matt in the cells when the liquor is withdrawn, the bottom discharge doors or cones, made tight with rubber or other gaskets, should be 30 inches or more in diameter to allow the chips to fall out readily. This packing is prevented somewhat by forcing a compressed air pipe down to the bottom of the cell and churning up the chips while the liquor is being removed. The air pipe can also be used to blow out the chips around the bottom when the door or cone is opened. If the arch of chips does not fall out readily the air pipe can be used to blow a hole or channel extending vertically from the bottom to the top of the chips and the sides of this channel can be removed by the air blast, a long poker or by a man in the digester with a pick. The chips fall to a conveyor underneath and are carried to the boiler when used for fuel, or are sent to intermediate storage when necessary and then to the high pressure pulp digesters for cooking the desired time, such as eight to ten hours at 60 to 100 or 125 pounds steam pressure with soda, sulphate or sulphite liquors of suitable strength to dissolve all but the cellulose.

Instead of removing the galactan, etc., first the larch chips may be extracted and pulped in the same operation in the pulp digester.

For economical operation it is necessary to recover the sodium hydrate, sulphide and sulphate from their liquors and the galactan and its conversion products are lost in the present day methods of incineration of the vacuum concentrated liquors and extraction of the ash, liming the extract, filtration and reuse of the liquors and chemicals for pulping. The sulphite liquor extracts obtained preferably from the fresh or even the extracted larch chips by the action of sulphite liquors, containing high sulphurous acid content for hydrolytic purposes, contain galactan and its hydrolysis products, such as galactose, and also contain glucose, pentoses, etc. These sulphite liquors are therefore unusual and valuable as a source of chemicals made from galactose. These liquors can be concentrated into a paste or solid sulphite extract which can be used as core binders, coal-briquette-binders or road binders, tanning materials, etc. The liquors may be neutralized as with lime and filtered, or aerated, or properly acidified as with sulphuric acid and aerated to remove sulphurous acid, and treated with nutrient materials like autolyzed yeast, malt sprouts, etc., and fermented at proper hydrogen ion concentration with a special yeast cultivated on galactose or such sulphite liquors, thereby producing ethyl alcohol from both the galactose and glucose contents. Likewise lactic and citric acids may be produced by means of the proper organisms. Or the liquors may be evaporated to solids or used in other chemical ways. For example, crude oxalic acid can be used to precipitate the final traces of calcium remaining after the addition of sulphuric acid and aeration to cause the precipitation and removal of calcium sulphate from calcium bisulphite liquor extracts of larch or any other wood. The solution is filtered and is then ready for concentration or other treatment and is therefore an excellent raw material for the production of mucic, oxalic, saccharic and other acids by the methods described in an earlier application (Ser. No. 160,909, filed April 10, 1917, renewal Ser. No. 458,133 filed April 2, 1921) and hereinafter e. g. by treatment with an oxidizing agent whose residual portion and reduction products should be of a form permitting recovery, reoxidation and reuse, such as nitric and nitrous acids and oxides of nitrogen, chlorine, chloric or chromic or other hyper-oxy acids, etc.

The aqueous extracts of the fresh chips contain the gummy galactan, tannin and other constituents and can be concentrated as by a vacuum pan or freezing to about a 60% to 90% solution and allowed to solidify and dry out as a dark crude galactan. This galactan-tannin material is useful in tanning and filling leather, etc. Or the solution can be freed from tannin and other coloring matter by aluminum sulphate, decolorizing carbons or other suitable means and a light colored galactan can be obtained by evaporation or by precipitation as with alcohol, filtration or decantation and recovery and reuse of the alcohol. The galactan can be used for making gums making galactose by hydrolysis with dilute acids, etc., making mucic acid by proper oxidizing agent, etc.

In order to make tannin extract I use the bark of waste butt and lumber logs and limbs and even the bodywood of suitable cellulosic material such as the western larch, spruce or hemlock. The bark is preferably removed in the spring while the sap is running but can be removed at any time from the butts, lumber logs, edgings, slabs, etc., by hand or by drum barkers, rossers or other suitable mechanical methods. For example, lumber logs can be taken directly from the cars or from the mill pond and run to the saw deck of the mill where the bark can be removed by a set of rotating knives acting on the rotating log. The knives or log can also be moved longitudinally to remove all the bark. The logs are then sawed into lumber, etc., and the lumber waste, slabs and the butts, etc., are slabbed and hogged into pulp chips. This method has the first advantage that the lumber logs are freed of dirt and stones in the bark which dull and break the mill saws and cause considerable extra expense. It has the second advantage that the removal of bark from the wood prevents the bark tannin from contaminating the sugar extracted from the wood pulp chips, such extract requiring less chemicals and operating costs for further purification and utilization. It has the third advantage that the wood chips are thus free of bark and give a much better pulp with less cost for chemicals, operations, etc., than when some bark is present. It has the fourth advantage that large quantities of the bark are very cheaply collected by machinery from the large supply of lumber logs and hence, lower costs and added revenue to the lumberman as well as to the extract producer. In this latter case some of the wood is taken off with the bark and on extraction yields galactan, galactose, mannose, and other sugars, depending on the kind of tree, which are of course found admixed with the tannin extracted from the bark. The removal of the outer layer of wood in this way is not always a lumber loss because western larch, for example, has an outer white layer which is sawed off the lumber boards as edgings. The bark is dried and stored, when desired, or can be used immediately. It is chipped, hogged, or otherwise broken up and e. g. screened into particles suitable for an extraction process of this kind and is then extracted in a series of proper extraction vessels with hot water or other suitable neutral, acid or alkaline medium, comprising added catalyzers when desired, under increased pressure and at about 100° C. if desired. The resultant, partly collodial tanning extract contains some sugar-bearing and other carbohydrates and if more of such admixed sugar compounds are desired for fermentation or other purposes they can be obtained by extracting a suitable mixture of the bark and sawdust, shavings, chips, or other appropriate waste from the butt logs, lumber logs, lumber, etc., or can be added e. g. from the sugar mixture obtained by extraction of the sawdust, pulp chips, etc., as set forth below. Such tanning extract is then used for tanning in the usual way, when desired; but for shipment it is preferably first concentrated in a suitable vacuum pan, vacuum drum dryer, spray dryer or other vessel to e. g. a 25% liquid extract or to a solid extract, to save freight. These extracts can be "recolloidized" and redissolved in dilute solution of appropriate hydrogen ion concentration, surface tension, etc., especially by the aid of mechanical "atomizing" or "emulsifying" equipment, and when so conditioned and then used in tanning they work practically as well as the initial extract. That is, the concentrated liquid or solid extract contains masses of flocculated colloidal particles of tannin and other organic materials which upon simple dilution of the mass with water do not return to the same dispersed condition in which they existed in the straight dilute extract. Hence the simple diluted or "redissolved" extract does not have the same tanning effect as the original straight extract. But by running this diluted extract through emulsifying equipment such as the colloid mill described in my application Ser. No. 737,309, I disrupt and disperse the flocculated masses into individual colloidal particles which therefore impart to the solution more nearly the properties found in the original straight extract. The extracted tan bark can be used for any appropriate purpose, such as for fuel, for making organic chemicals, or for making cellulosic products, such as roofing felts impregnated with pitches, etc. Volatile organic acids like acetic and formic collected by condensing the vapors given off during the concentration of the tanning extracts can be utilized in any appropriate manner, such as for making their salts or for extraction of more tan bark or wood chips, or hydrolysis of galactan.

Such a western larch tanning extract is a new product with a very desirable yellow shade and other qualities and can be made very cheaply by my unitary continuous process for making pulp, sugars and products from them, and tannin extracts from the bark and body wood of this given species. One very valuable new feature in its composition is the galactose and other carbohydrates present in the tanning extract of the bark and associated wood and which are especially useful in some of the fermentation processes met with in the tanning. No raw material comprising associated wood and bark, so far as I am aware, has been shown to yield a tanning extract containing such quantities of galactan or galactose, and my products, therefore, represent a new discovery in the composition of tanning materials in general, namely, a tanning extract comprising quantities of the highly desirable but very rare carbohydrate galactan or galactose and of galactose compounds. The western larch tanning extract gives an excellent leather with the more desirable yellowish shades rather than the red shades.

I have made a very important advance in the art of digesting and making cellulosic materials and of extracting and concentrating the tanning and sugar-like liquors from the bark and wood tissue of trees and plants in that instead of using a given percentage of acid or alkali at the beginning or during the operation as others do, I regulate the hydrogen ion concentration (Ch) or the pH (i. e.—log Ch) of the solution during the digestion and extraction, during the concentration and during and in connection with the use or application (oxidation, absorption, etc.) of the tanning and sugar extracts e. g. in tanning leather and other materials. In other words, I have found in various researches on these plant extracts, and on others such as extracts of malt, beans, oatmeal, etc., for culture media for bacteria, fungi and other plants, that solutions of substances like gallic acid (trihydroxybenzoic acid) tannic acid (di-gallic acid), or protocatechuic acid (dihydroxybenzoic acid) and of proteids or other compounds of basic properties, which are extracted from the bark and wood along with acetic and other natural acids, act as "buffers" and can, therefore, be systematically, slowly and regularly decreased or increased in hydrogen ion concentration by the addition of strong bases or acids or of salts of weaker acids or bases. The pH value is measured by means of the hydrogen electrode or colorimetrically against standard indicator solutions checked by the hydrogen electrode. The method is so exact that I can express or show graphically in a "titration" curve the relation between the hydrogen ion concentration or pH value of a tanning extract, or other solution, of a given composition and the molecular equivalents of added alkali, acid or other suitable chemical. The attached figure gives such a titration curve for a sample of chestnut bark extract. The regulation of the pH value is of great importance in each of the steps of extraction, evaporation, recolloidizing, or application of the extract to leather, etc., including the oxidation, fermentation, precipitation and other steps. My disclosures involve the use of these methods in other commercial fields, suggested hereby, such as the sugar industry, electro-plating and electro-chemical syntheses, oxidation and reduction reactions such as are involved in the preparation and use of photographic developers, various dyes and intermediates, different series of chemicals of graduated oxidizing power like hypochlorites up to perchlorates, and various processes in which partial or complete hydrolysis or reduction or oxidation or neutralization or precipitation or solution of agents is effected in true solutions or in colloidal or dispersoidal phases. Taking a concrete case of the regulation of the hydrogen ion concentration, it was observed in making the titration curve of the chestnut bark extract or other tanning extracts that the color darkens as the pH increases up to say 9 or 10 i. e. as more alkali is added and that this color becomes lighter as the pH of the solution is again decreased to say 3 or 4 by addition of acids. Likewise the color of the leather dyed in such regulated extracts also varies with the pH value. It is clear, therefore, that the pH value of the tanning extract must be regulated for the particular use. I have, therefore, devised methods for making intimately contacted solid and liquid buffer mixtures which will give definite pH values when dissolved in definite volumes of pure water. These intimately subdivided and contacted buffer mixtures may be made up in definite quantities, such as in small tablets of definite weight, or in large masses, but in order to secure the greatest uniformity in hydrogen ion regulation the ingredients must be very intimately contacted so that any smallest desired portion such as 0.10 grain made into a tablet will have the same proportions of each constituent as any larger portion or the entire mixture and so that all portions used in a given concentration will give the same pH or hydrogen ion value.

This intimate contacting of such ingredients can be effected by thoroughly mixing definite proportions by weight of the desired dry or uniform ingredients ground to pass through a 200 mesh sieve. The correct proportions to give such a titration curve must be determined experimentally or calculated from known experimental data in each case, and preferably plotted in a curve as above for chestnut bark extract.

In such cases as these tanning extracts the original or the buffered extract having a given volume and pH can be evaporated to a uniform paste or to a powder in vacuum pans and drum dryers and the resulting concentrated paste or solid will have the same pH when made up again as a liquid extract in the same original concentration, provided that the processes have been carried out without oxidizing or chemically altering the constituents. Even if the manufacturer's particular methods of operation cause chemical changes which he can regulate he can, by practice, secure the necessary data to tell the pH value that his extract will have when made up again as a liquid of given concentration. He can also make various solid or paste extracts of different degrees of adjustment or regulation with appropriate alkali or acid and can after experimentation mix these extracts in the desired proportions to give any pH desired by the tanner. These buffer mixtures are largely self-regulating so that approximately the same pH is obtained from a given buffer mixture even if a workman makes a mistake in the concentration of his stock tanning liquor.

With this description and these examples any one skilled in this art of making extracts and using the hydrogen electrode can manufacture such buffer mixtures and apply them in the various commercial and scientific fields.

One advantage of regulating the pH value during the extraction and concentration of the tanning liquor is that I thereby prevent the precipitation or coagulation of soluble or colloidal or dispersoidal or other valuable parts of the tanning materials, e. g. tannic acid, which is thrown down in hot solution of too high acidity. Another advantage of regulating the pH value during the concentration of the tanning extract is that when such solutions are too acid they attack the tubes and plates of the bronze, copper or tilelined vacuum evaporating pans.

In tanning leather and other substances it is important to regulate the pH, rather than the total acidity or alkalinity, in many of the processes, such as in depliation of the hides by liming, in bating, drenching and other fermentation stages, tanning proper, fixing of the tan in the leather by buffers such as cream of tartar, mucic acid or "mucic acid products" (such as metallic derivatives, monoesters, the lactones, allo, talo,—or dehydromucic acid, etc.), or other such processes as chroming, tawing, or oiling, etc., in which oxidation-reduction, precipitation, etc., take place. The mucic acid and its products mentioned above can also be used as buffers alone, or admixed with other buffers (e. g. acids) in the above described reactions and other commercial operations involving such fundamental principles.

In certain of the appended claims, I have used the term "western larch waste material" as designating both the butts, sawdust, slabs, edgings, bark and mixtures thereof, whether in the form of large pieces or comminuted.

I claim:

1. A tanning extract obtained from western larch bark and wood containing tannins in such proportion as to constitute a tanning agent, and containing soluble fermentable carbohydrates.

2. A tanning compound obtained by neutralizing the hydrolytic agent contained in the extract solution of western larch bark, which extract contains tannins in such amount as to constitute a tanning agent.

3. A concentrated tanning extract from western larch bark, containing carbohydrates and tannins.

4. A concentrated tanning extract from western larch bark, containing galactose and other sugar products and tannins from western larch.

5. A tanning extract from western larch bark, containing galactose and buffer materials and tannins, such extract being of at least sufficiently high concentration to be usable as a tanning liquor.

6. A tanning extract from western larch containing natural tanning acids of the western larch and buffer compounds and galactose.

7. A tanning extract compound containing natural tanning acid of western larch together with added buffer regulating compounds.

8. A concentrated tanning extract from western larch waste material containing natural acids and buffer compounds.

9. A concentrated tanning extract compound containing natural tanning acid of western larch together with added buffer regulating compounds.

10. A tannin extract derived from the western larch waste material containing fermentable products derived from said waste material.

11. The method of preventing the precipitation or coagulization of the colloid parts of the tannin materials obtained from the western larch which comprises regulating the hydrogen ion concentration of said tanning liquor during the extraction and concentration thereof.

12. A tanning material comprising the soluble constituents of western larch bark including the tannins.

13. A tanning material comprising the acid soluble constituents of western larch bark and of western larch wood including the tannins.

14. A highly concentrated mixture derived from western larch and including galactose and tannins, suitable for use in tanning.

15. A new composition of matter derived from western larch and comprising tannin and somewhat hydrolyzed galactan, both in a concentrated condition.

16. A highly concentrated material derived from western larch and suitable for use in tanning, containing tannins and at least one soluble carbohydrate selected from the group consisting of galactan and galactose.

In testimony whereof I have affixed my signature.

SOLOMON F. ACREE.